United States Patent [19]

Spacek

[11] Patent Number: 5,669,276

[45] Date of Patent: Sep. 23, 1997

[54] APPARATUS FOR CABLE STRIPPING

[76] Inventor: Timothy Spacek, 5665 SW. Woodham St., Palm City, Fla. 34990

[21] Appl. No.: 658,184

[22] Filed: Jun. 4, 1996

[51] Int. Cl.$^6$ .................................................. H02G 1/12

[52] U.S. Cl. .................. 82/128; 82/130; 30/90.1; 81/9.51

[58] Field of Search ........................... 82/130, 131, 128; 81/9.51, 9.4; 30/91.2, 90.1; 29/564.4

*Primary Examiner*—Daniel W. Howell
*Assistant Examiner*—Mark Williams
*Attorney, Agent, or Firm*—Kevin Redmond

[57] ABSTRACT

A cable stripping apparatus designed to strip an end of a cable that includes an outer shield and a layer of insulation surrounding a center conductor. The stripping is accomplished by removing the outer shield at a first predetermined location and by removing the insulating layer at second predetermined location. The apparatus comprises a cutting head which includes a cable guide port, one or more cutting blades with their cutting edges facing into the cable guide port and one or more blade actuating mechanisms which drive the blades into the cable guide port and into the surface of the cable to strip the cable when the cutting head is rotated about the cable end. The end of the curing head about the cable guide port is compact, permitting it to be used to strip the ends of cables located in area where larger devices could not be accommodated. The advantage of the compact head end is maintained even though centrifugal force is used to automatically actuate the cutting blades as the cutting head is rotated.

17 Claims, 2 Drawing Sheets

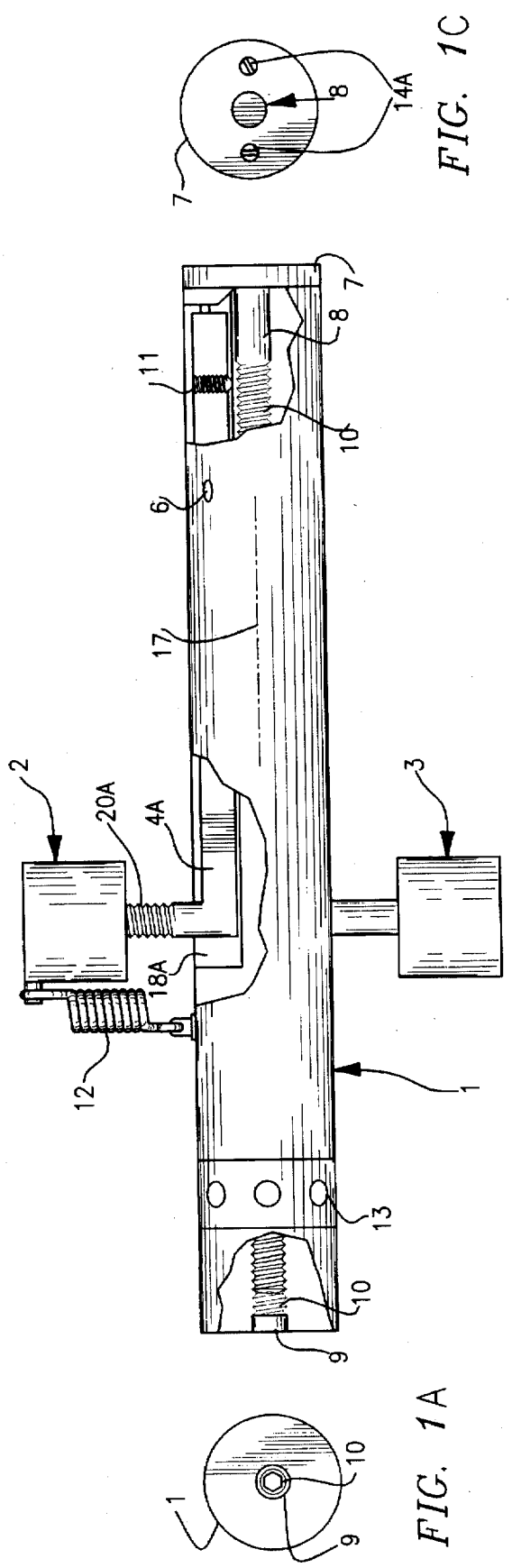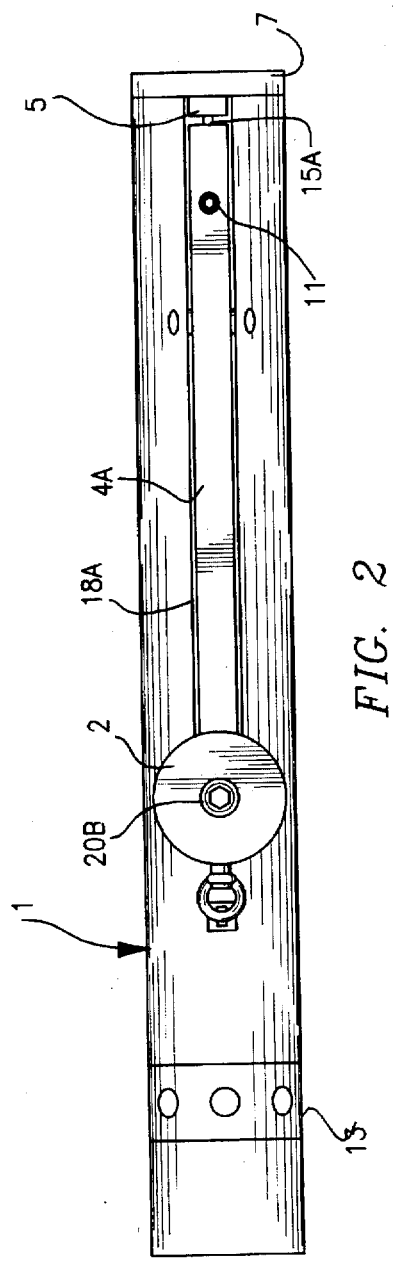

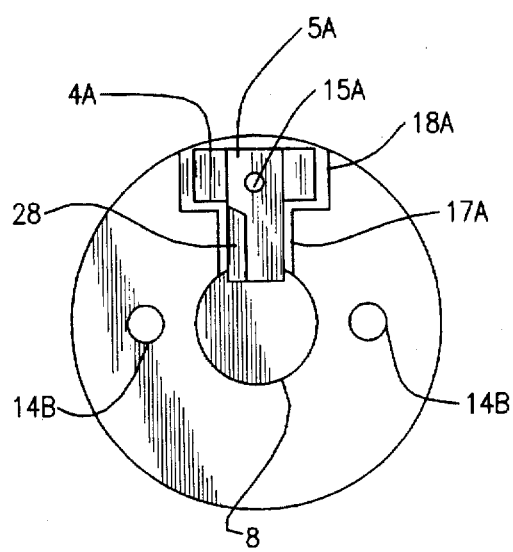
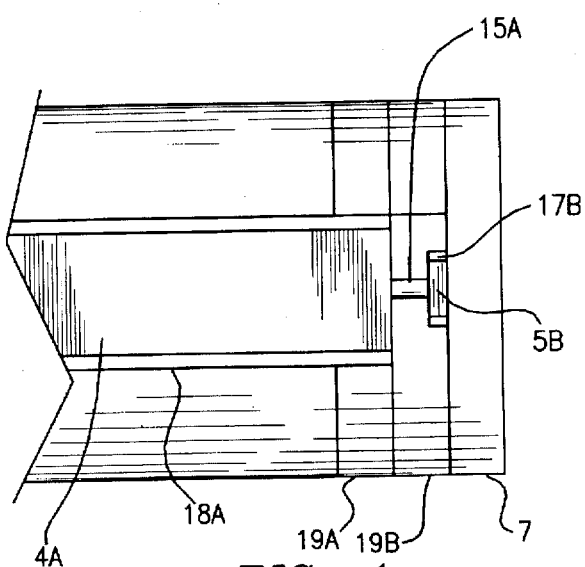
FIG. 3  FIG. 4
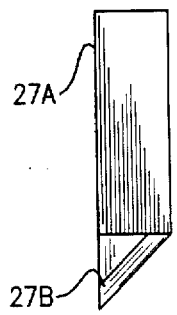 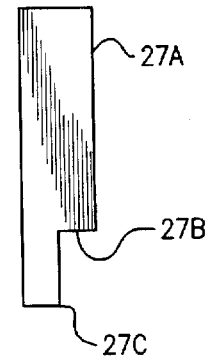 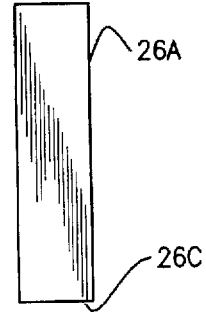 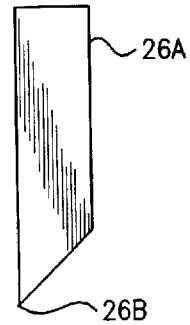
FIG. 5A  FIG. 5B  FIG. 5C  FIG. 5D
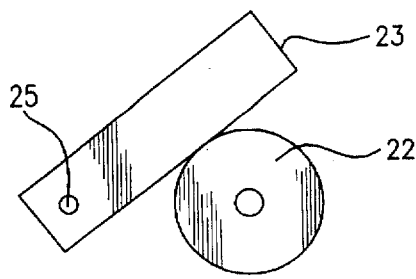 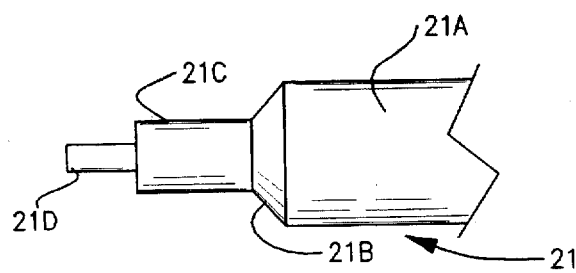
PRIOR ART
FIG. 7  FIG. 6

APPARATUS FOR CABLE STRIPPING

PRIOR ART

Cables typically used in RF circuitry are those of the coaxial variety where a center conductor is surrounded by a concentric layer of insulation and a concentric outer metal shield. A commonly used type of coaxial cable is the semirigid cable in which the outer shield is formed of soft copper, enabling the cable to be easily bent without appreciably degrading its RF properties. Unfortunately, after bending, the insulating layer creeps in a manner that is not totally predictable. In addition, the exact length of the cable after it has been bent is also not totally predictable, causing significant problems in many applications.

For example, in right angle RF connectors, a semirigid cable bent at a right angle may be used to carry RF energy from a first connector port to a second connector port. This cable is usually first connected to the first connector port, bent, and then stripped at the exact location desired to insure a precise RF phase length through the cable, and thereby make it possible to provide a uniform phase length from connector to connector. The cable in such connectors is usually short, sometimes being only a fraction of an inch long. The free end of the cable to be stripped is held close to the connector because the opposite end of this short cable is connected to the first port of the connector. This position of the free end of the cable, which is either close to or sometimes even inside a connector and may have a maximum length of only one inch, prevents the use of prior art cable stripping devices that have a large cutting head, where the cutting heads can be two inches or more in diameter.

One reason some prior art stripping devices have relatively large heads is they contain cutting blades in the cutting head which are directly linked to weights that act under the influence of centrifugal force. These weights are also located in the head, usually directly outboard of the blades. The weights and direct linkage occupy considerable space in a radial direction from the cable, resulting in a cutting head with a relatively large diameter. Examples of such prior art stripping heads are shown in U.S. Pat. Nos. 4,019,409 and 4,987,801.

Another reason for a large cutting head assembly found in some prior art devices is the head is directly connected to the gearing and mounting means used for the entire apparatus assembly. This type of assembly is shown in the large manually driven cutting head assembly described in U.S. Pat. No. 4,487,110. This reference patent also illustrates a second deficiency found in some prior art devices. In this reference patent, the cable end to be stripped must pass through a relatively long cable guide port which is in the order of one-half inch or more. The cable must pass through this long cable guide port before the cable meets the cutting blades. In applications where the cable is short, as it is in right angle connectors, there is usually insufficient cable available to pass through such long cable guide ports.

A further disadvantage found in prior art apparatus is the cutting blades are driven into the cable along the side of the blade rather than at the end of the blade. This prior art method of stripping the cable is shown in FIG. 7 in which a cutting blade 23 is pivoted about a pivot point 25 and driven by a force 24 against a cable 22. In this method, a longitudinal edge of the blade 23 is used as the cutting edge. This arrangement generally prevents the use of a forming edge to make special angle cuts in the shield of the cable. These and other deficiencies of the prior art are overcome in the present invention as described in the following sections.

SUMMARY

An object of the present invention is to provide an apparatus capable of stripping a cable that is in locations where a relatively small cutting head is required, such as a head having a typical diameter of less than one inch.

An object of the present invention is to provide an apparatus that, despite the use of a small diameter head, preserves the important feature of automatic actuation of the blades by centrifugal force to speed the stripping operation.

An object of the present invention is to provide an apparatus capable of stripping a short length of cable at short distances from the cutting end of the head.

An object of the present invention is to provide an apparatus which permits the use of forming blades to place special angle cuts into the shield of a cable.

The head of the present invention is formed of a small shaft that is typically three-quarters of an inch to an inch in diameter. At one end of the shaft, designated the cutting end, a cable guide port is formed in the shaft. The cable guide port, which is centered about the longitudinal central axis of the shaft, is designed to accept the end of a cable to be stripped. To accomplish the stripping operation, this port is made slightly larger in diameter than the cable to be stripped, permitting the head to initially rotate about the cable without interference with the cable. Within the head at the cutting end, are one or more blades that are positioned radially with respect to the longitudinal central axis of the shaft. These blades extend into the cable guide port with their cutting edges facing the cable to be stripped. As the head is rotated, these blades are driven into the cable to selected depths to cut a particular layer such as the outer shield or the insulating layer. When the rotation is stopped, the blades automatically retract and the stripped cable can be removed from the cable guide port.

The blades are contained in radial slots in the head or in radial slots in shims added to the end of the head and are referred to as blade slots. For example, a first blade can be held in a first blade slot which is formed in the shaft at its cutting end, runs radially with respect to the longitudinal central axis of the shaft and extends from the cable guide port to the outer surface of the shaft. Within the first blade slot is placed the first cutting blade with its cutting edge facing the cable guide port. Covering the end of the shaft and the first blade slot is a relatively thin disc referred to as the blade cap. The blade is held in position in the first blade slot by the walls of the first blade slot and the blade cap, but is free to move radially with respect to the longitudinal central axis of the shaft. This path of free movement of the blade enables its cutting edge to be placed in contact with the end of a cable positioned in the cable guide port, and strip the cable as the head is rotated about the cable. The blades are driven into the cable by means of a special linkage that is recessed below the surface of the shaft and runs generally longitudinally away from the cutting end to an automatic actuation system located remotely from the cutting end.

The blade cap serves two functions. It enables a blade to be accessed relatively quickly by simply removing the blade cap and it allows relatively short cables to be stripped because the blade cap is relatively thin. The blade cap is typically secured to the cutting end of the shaft by two screws. By removing these screws, a blade can be accessed easily for inspection or replacement. Because the cap is thin, only a short length of cable is required to pass through it to the location of the cutting blade, thereby making it possible to strip short cables.

Special angle cuts can be made into the shield of a cable or on the center conductor by using the radial blade drive system of the present invention and a forming blade containing at the tip of the blade the shape and angle of the cut to be made into the cable shield. The blade slot can be offset or the blade can have an offset of the cutting tip so that the tip only enters the cable along a single radius of the cable, enabling the blade to peal off the excess metal in successive layers without leaving any appreciable burrs and without undesired compression of the cable.

BRIEF DESCRIPTION OF THE DRAWINGS

FIG. 1A is a view of the drive end of the cutting head of the present invention.

FIG. 1B is a side view of the cutting head of the present invention.

FIG. 1C is a cutting end view of the cutting head of the present invention.

FIG. 2 is a top view of the cutting head of the present invention.

FIG. 3 is an enlarged view of the the cutting end of the cutting head of the present invention with the blade cap removed.

FIG. 4 is an enlarged view of the top of the cutting end of the cutting head of the present invention, showing the use of blade shims to position a blade at a desired location from the cutting end of the cutting head.

FIG. 5A shows a side view of a forming blade with an offset tip.

FIG. 5B shows a front view of the forming blade of FIG. 5A.

FIG. 5C shows a front view of a forming blade without an offset.

FIG. 5D shows the side view of the blade shown in FIG. 5C.

FIG. 6 shows a side view of a cable with the shield cut at an angle.

FIG. 7 shows a prior art arrangement for driving the cutting blade into a cable.

DETAILED DESCRIPTION OF THE INVENTION

The principal component of the cutting head of the present invention is a body formed of a cylindrical shaft 1, shown in FIG. 1B. The shaft has a drive end shown in FIG. 1A, a cutting end shown in FIG. 1C, and a longitudinal central axis 17 passing through the entire length of the shaft at its center. The shaft at its cutting end is covered by a blade cap 7, which is a thin disc of the same general diameter as the shaft. The blade cap is connected to the cutting end of the shaft by means of the screws 14A, as shown in FIG. 1C.

In the center of the blade cap 7 is a generally cylindrical cable guide port 8 which extends typically two-and-one-half inches into the shaft, but the depth of which can be varied depending on the application. The cable guide port is centered about the longitudinal central axis of the shaft. This port is used to accept the end of a cable to be stripped. The depth to which the cable is permitted to penetrate into the cable guide port is determined by a cable stop positioned at the inside end of the cable guide port. The cable stop comprises a cable stop screw 10 and a cable stop port 9, shown in FIGS. 1A and in the break-away view in the drive end of the shaft shown in FIG. 1B. The cable stop port 9, which is centered about the longitudinal central axis of the shaft, enters the opposite end of the shaft from the cable guide port as shown in FIG. 1A and extends through the shaft to connect with the cable guide port. The cable stop port is threaded to accept the cable stop screw 10. The cable stop screw is threaded into the cable stop port until the right end of this screw enters the cable guide port and progresses on to a selected point where the cable is to be stopped.

A cable end, after having been placed into the cable guide port, is stripped by one or more blades driven into the cable as the head rotates about the cable. Each blade is guided in its movement into the cable by a slot such as the first blade slot 17A which is made in shaft 1, as shown in FIG. 3. FIG. 3 shows the cutting end of the shaft 1 without the blade cap 7 covering it. A first blade 5A is placed in slot 17A and positioned radially with respect to the longitudinal central axis of the shaft. In this position, it is free to move in this radial direction within the walls of the first blade slot 17A. In FIG. 3, this motion is up and down, with the downward motion propelling the lower cutting edge of the blade into the cable guide port 8 where it contacts and cuts into the cable end to accomplish the stripping operation.

Where only a single blade is used, only the blade cap 7 shown in FIGS. 1B and 1C covers the end of the shaft and holds the blade in its slot. The blade cap is held in place by screws 14A which are threaded into threaded holes 14B located in the shaft, as shown in FIG. 3. This arrangement provides quick access to the blades for inspection or replacement. The blade is easily removed for replacement by lifting it off of a first blade drive pin 15A passing through the top of the blade as shown in FIG. 3. The blade drive pin is also shown in the plan view of FIG. 4.

The blade drive pin is connected to a blade drive mechanism which essentially consists of a lever and a weight. The weight is connected to the lever at a location remote from the cutting end of the shaft to permit the shafts cutting end to be compact. As the shaft is rotated to strip the cable, the weight is automatically moved radially outward from the shaft by means of centrifugal force. The radially outward movement is translated through the lever to become a radially inward movement that moves the blade into the cable to carry out the stripping operation.

The first blade drive pin 15A connects the first blade 5A to a first lever means 4A. It can be seen from FIGS. 1B, 2, and 3 that the first lever means is essentially a long arm that extends from directly behind the blade to beyond the midpoint of the shaft. At its right end, the first lever means is connected to the blade by the first blade drive pin 15A. At its left end, the lever means 4A is connected to weight 2. Between its ends, the first lever means is pivoted about a fulcrum means 6, which is a pin rotatively connecting the first lever means to the shaft. To preserve a small diameter head, the first lever means is recessed into the shaft in a first lever means slot 18A which is located next to the surface of the shaft and is open on one side to the surface of the shaft. This slot runs parallel to the longitudinal central axis of the shaft and is made sufficiently wide and deep to prevent interference between the first lever arm and the walls of this slot. The pin forming the fulcrum means 6 passes through one side of the shaft, one side of slot 18A, the first lever means, the opposite side of slot 18A, and the opposite side of the shaft to provide a rotatable connection between the first lever means and the shaft. This location of the fulcrum means between the ends of the lever means causes the necessary reversal in the direction of movement from one end of the lever means to the other. As the weight connected to the lever means is driven radially outward by centrifugal force, the opposite end of the lever is driven radially inward towards the center of the shaft, causing the blades to be driven inward towards the cable to perform the stripping operation.

To counter balance weight 2 during the rotation of the shaft, a second weight 3 of the same mass as weight 2 is connected to the shaft at a point that is diametrically opposite the position of weight 2. A spring 12 is connected between weight 2 and the shaft to control the rate at which weight 2 moves radially outward from the shaft as the shaft is rotated. The spring tension controls the movement of weight 2 and by way of this weights linkage to the blade through the lever means, the rate at which the blade is advanced into the is also controlled by the tension in this spring.

The connection of weight 2 to the lever means 4A is made by means of a threaded shaft 20A which is connected to the lever means at its left end and extends from this connection to the lever means radially outward with respect to the longitudinal central axis of the shaft. The weight 2 contains a threaded hole 20B which accepts the thread shaft 20A. The initial radially outward position of the weight 2 with respect to the longitudinal central axis of the shaft when the shaft is at rest is determined by how far down on thread shaft 20B the weight 2 is threaded. This ability to adjust the radial position of the weight with respect to the longitudinal central axis of the shaft also determines the at rest tension on spring 12 and thus the rate at which the blade is advanced against the cable.

If desired, an additional adjustment to the initial spring tension and the rate at which the blade moves can be made by simply varying the mass of the weight 2.

The depth of penetration of the blade into the cable is controlled by a blade depth adjustment screw 11 shown in FIG. 2 and in the break-away view to the right in FIG. 1B. Screw 11 is threaded through the lever means in a radial direction with respect to the shaft at a point between the fulcrum means and the blade. Screw 11 protrudes below the lever means to contact the bottom of slot 18A and stop the downward motion of the lever means and the blade beyond a selected point determined by the setting of the adjustment screw 11 in the lever means.

FIG. 4 shows the use of shims at the cutting end of the shaft to position a blade away from the cutting end face of the shaft. In this Figure, shims 19A and 19B separate the blade cap from the cutting end face of the shaft. These shims are typically 0.1 inch or less in thickness and are of the same general cross section as the shaft. They have two holes to accept the screws 14A which are used to secure both the end cap 7 and these shims to the cutting end of the shaft. The shims also contain the cable guide port positioned about the longitudinal central axis of the shaft. Shim 19B also has a blade slot 17 B referred to herein as the second blade slot. This slot is similar to blade slot 17A and performs the same function with a second blade 5B, but is positioned father from the cutting end of the of the shaft to produce a cut in the cable at a different location than that of the first blade.

In a typical application, a semirigid cable is to have its outer shield stripped at a distance of 0.25 inch from the end of the cable. The insulating layer about the center conductor is to be stripped at 0.125 inch from the end of the cable. Both of these stripping operations can be carried out simultaneously with the present invention by using the shims described above and a second drive mechanism consisting of a second weight and a second lever and fulcrum means. The second drive means typically uses the counter balance weight 3 as the weight for this system. In most respects the second drive mechanism is similar to the first with a few exceptions. The exceptions are as follows:

1. The second drive mechanism is located on the opposite side of the shaft from the first.
2. The counter balance weight is detached from the shaft and connected to the second lever means for use as the actuating weight for the second drive mechanism. This weight also continues to serve as the counter balance for weight 2.
3. The second blade is located at a distance from the cutting edge face of the shaft by means of one or more shims.
4. At least one of the shims contains a second blade slot and a second blade.
5. Either the second lever means or second blade pin is longer to span the extra distance from the cutting end of the shaft to the blade caused by the addition of shims.

Since the above differences between a drive mechanism on a first side of the shaft and the opposite side of the shaft are relative minor and all the basic elements have been shown in the drawings for the drive mechanism, the virtually identical second drive mechanism is not shown to avoid unnecessary redundancy in the drawings and the description.

It is clear from the above description that more than a second drive mechanism and blade can be added. For example, two more drive mechanisms and blades can be added centered about a shaft diameter that is orthogonal to the diameter that is centered on and connects the first and second drive mechanisms. However, the number of drive mechanisms and blades is not limited to four, although the difficulty of manufacture and assembly is increased in adding more. Two drive mechanisms are usually sufficient for most applications, with three or four being required only rarely.

The rotational driving source to rotate the shaft about its longitudinal axis can take many forms. The left end of the shaft as shown in FIGS. 1B and 2 is typically held in a clutch which is rotated by a motor drive system. The clutch can be simply tightened on to the shaft or a quick coupling clutch can be used which engages the depressions shown in quick coupling bearing surface 13 which is shown on the left end of the shaft in these Figures.

The present invention can be used to provide special angle cuts in the shield of the cable or in the center conductor as shown in FIG. 6. In this Figure a coaxial cable end 21 comprises a shield 21A, an insulating layer 21C, and a center conductor 21D. Unlike typical stripping operations, the shield is not cut radially inward with respect to the central axis of the cable. In this Figure it can be seen that the cable shield has been cut at an angle 21B with respect to the horizontal. This angle in the shield is useful in some applications to aid is passing tightly fitting connector parts over the cable shield.

To produce this angle in the shield, a special blade with a forming tip is used, such as those shown in FIGS. 5A, 5B, 5C, and 5D. FIGS. 5A and 5B show a blade 27A with a forming tip 27B. FIGS. 5C and 5D show a second blade 26A with a forming tip 26B. FIG. 5A is the side view of the blade shown in FIG. 5B and FIG. 5D is the side view of the blade shown in FIG. 5C. Both of these blades have a tip with a shape that include the desired angle to be cut into the shield; however, the cutting operation of the shield by the blade is different from that described above for blades without forming tips. With the blades that have the forming tip, such as tip 26B on blade 26A, the blade tip is fed down into the cable in such a way that the corner of the tip 26C moves along a line such as dotted line 28 in FIG. 3 to meet with and remain with the cable on a single radial line with respect to the longitudinal central axis of the cable. The corner of the blade tip cuts into the cable shield in a way similar to the way in which a lathe tool machines metal from a work piece in a lathe. The corner edge of the forming blade tip machines the cable shield to produce the desires angle in the shield without pressing the shield into the insulation and without tearing which could leave a rough or broken edge and burrs. The cut is made cleanly and has been used successfully in the field through many thousand of operations without difficulty.

With a standard blade slot, such as slot 17A shown in FIG. 3, the corner of the forming tip on blade 27A will enter and continue into the cable along a single radius from the center of the cable because the corner of the forming tip is moved from the side of the blade by an offset 27D designed to place the corner on a radius such as line 28 in FIG. 3. The same result can be achieved with a blade such as 26A which does not have an offset by placing it in a blade slot which itself is offset to have one side aligned with line 28. In that case, the corner of the forming tip 26C will be driven down into the cable along a single radius drawn from the center of the cable and aligned with line 28 to achieve the desired machining operation.

It is usually desired to produce this special angle cut into the shield without leaving burrs or deforming the cable. It was difficult to achieve these objectives in many prior art systems because the blade was driven into the cable along the longitudinal side of the blade as shown in FIG. 7 and as described in the prior art section above.

Having described our invention, I claim:

1. Apparatus for stripping a cable of the type having a center conductor, said center conductor typically being surrounded by a generally coaxial insulator and an outer coaxial shield, the stripping operation of said cable consisting of removing the shield from the insulator and the insulator from the center conductor at an end of said cable, said apparatus comprising:

(a) a shaft having a first and a second end and a longitudinal central axis extending from said first end to said second end of said shaft, (b) a port centered in said first end of said shaft to accept an end of said cable to be stripped with the center conductor of said cable being generally aligned with the longitudinal central axis of said shaft, said port extending inwardly of said shaft from its opening into said shaft located at said first end of said shaft and said port being generally centered about the longitudinal central axis of said shaft, and said port having a cross section in a plane orthogonal to said longitudinal central axis of said shaft that is greater than the cross section of the cable to be stripped to enable said shaft to rotate about its longitudinal central axis and about said cable end when inserted in said port without interference between said cable and said shaft, (c) a first slot in said shaft being positioned radially with respect to said longitudinal central axis of said shaft, said first slot extending from the outer surface of said shaft inwardly of said shaft to intersect said port to form an opening of said slot into said port, (d) a blade having a cutting edge, said blade being located within said first slot with its cutting edge facing said cable and said blade having a cross section that enables said blade to slide within said first slot and be guided by the walls of said first slot for movement generally radially with respect to said longitudinal central axis of said shaft, said opening of said slot into said port enabling the cutting edge of said blade to extend through said opening and contact said cable when said cable is inserted into said port, (e) lever means having a first and a second end, said lever means extending longitudinally between said first and second ends generally along the surface of said shaft in a direction generally parallel to said longitudinal central axis of said shaft, said lever means including a lever drive means located about and attached to the second end of said lever means, and said lever means further including fulcrum means located between said first and said second end of said lever means, said fulcrum means rotatively connecting said lever means to said shaft, and said lever means being flexibly attached to said blade at the first end of said lever means, said lever drive means, when activated, moving said cutting edge of said blade into contact with said cable by moving the second end of said lever means in a direction generally radially outward with respect to said longitudinal central axis of said shaft, and p1 (f) means for rotating said shaft about said longitudinal central axis of said shaft to activate said lever drive means and drive the cutting edge of said blade into engagement with the entire circumference of said cable to penetrate and strip said cable.

2. Apparatus as claimed in claim 1, wherein said lever drive means includes a first weight attached to the second end of said lever means, said first weight being driven radially outward with respect to the longitudinal central axis of the shaft by means of centrifugal force occurring as said shaft is rotated about its longitudinal central axis, the first end of said lever means being driven simultaneously radially inward with respect to the longitudinal central axis of said shaft by said first weight acting through said lever means, and said blade being driven radially inward with respect to the longitudinal central axis of said shaft by the radially inward movement of said first end of said lever means to place said blade in contact with said cable and to strip said cable.

3. Apparatus as claimed in claim 2, further including an elastic restraining means attached between said first weight and said shaft to impart a restraint on the radially outward movement of said first weight as said shaft is rotated and to return said first weight to an initial at rest position in proximity to said shaft and retract said blade from said cable when rotation is terminated.

4. Apparatus as claimed in claim 3 wherein said first weight is adjustably attached to said lever means for positioning said weight when at rest outwardly of said shaft to adjust the level of centrifugal force applied against said restraining means and adjust the rate of movement of said blade against said cable.

5. Apparatus as claimed in claim 3, wherein said elastic restraining means is a spring.

6. Apparatus as claimed in claim 2, further comprising a second weight generally equal in mass to said first weight, said second weight being connected to said shaft at a location that is generally diametrically opposite the position of said first weight on said shaft to serve as a counter balance for said first weight.

7. Apparatus as claimed in claim 1, wherein said shaft contains a second slot, said second slot extending at least the length of said lever means longitudinally along the surface of said shaft in a direction generally parallel to said longitudinal central axis, and said second slot being proportioned and positioned on said shaft to accept said lever means without interference with said shaft and to enable said lever means to be generally contained within said second slot below the surface of said shaft.

8. Apparatus as claimed in claim 1, wherein said fulcrum means includes a pin passing through said shaft and said lever means in a direction orthogonal to the longitudinal direction of said lever means at the the location of said fulcrum means.

9. Apparatus as claimed in claim 1, further comprising a first stop means connected to said lever means and projecting inwardly towards said shaft in a radial direction with respect to the longitudinal central axis of said shaft at a location along said lever means between the first end of said shaft and said fulcrum means, said first stop means functioning to set the depth of penetration of said blade into said cable by setting the depth of movement of the first end of said lever means towards said shaft.

10. Apparatus as claimed in claim 9 wherein said lever means further includes a first threaded hole at the location of said stop means extending through said lever means radially with respect to said longitudinal central axis of said shaft, and said first adjustable stop means includes a threaded set screw threaded through said first threaded hole to project inwardly of said lever means towards said shaft to contact said shaft and form said first adjustable stop means.

11. Apparatus as claimed in claim 9, further comprising a second adjustable stop means generally centered about said longitudinal central axis of said shaft and extending from the end of said port within said shaft and located away from the opening of said port, said second adjustable stop means projecting outwardly towards the opening of said port and being adjustable in position in a direction along said longitudinal central axis of said shaft to contact an end of said cable inserted into said port to set the depth of penetration of said end of said cable into said port and set the location at which said cable end is to be stripped.

12. Apparatus as claimed in claim 10, wherein said shaft further includes a second threaded hole extending generally along said longitudinal central axis of said shaft from said second end of said shaft to said port, said second adjustable stop further comprising a second threaded set screw, said second threaded set screw being threaded through said second threaded hole into said port to form said second adjustable stop.

13. Apparatus as claimed in claim 1, further comprising a removable blade cap that is attached to the first end of said shaft, said blade cap being generally in the form of a disc with a first and a second generally parallel planar surface with a blade cap axis passing through and positioned orthogonal to said first and second planar surfaces at their center, said blade cap further having a cap port centered about said cap axis with a diameter generally equal to that of said port, and said blade cap having an outside diameter generally equal to that of said shaft, said blade cap being attached to the first end of said shaft with the first parallel planar side of said blade cap being placed against the first end of said shaft and with said blade cap being oriented to align the cap axis with said longitudinal central axis of said shaft, said blade cap port forming an extension of said shaft port when said blade cap is attached to said shaft, said first slot being formed by a slot in said shaft having one surface open to the first end of said shaft and said open surface of said first slot being covered by said blade cap when said cap is attached to said first end of said shaft.

14. Apparatus as claimed in claim 13, further comprising a slotted shim having the same general configuration as said blade cap including a shim port having generally the same size and relative location as the cap port in the blade cap, said slotted shim having a radial slot in one of its planar surfaces to carry a blade, said radial slot extending from said shim port radially outward to the outside periphery of said shim, and said shim being positioned between the first end of said shaft and said blade cap to position a blade beyond the the first end of said shaft.

15. Apparatus as claimed in claim 1, wherein the cutting edge of said blade is in the configuration of a forming tool to produce a shape in cable at the point of stripping that is also in the configuration of the forming tool.

16. Apparatus as claimed in claim 15 wherein one side of the blade slot lies generally along a radius drawn from the longitudinal central axis of the cable when in the cable guide to guide the corner of the cutting edge to the center of the cable to enable the forming configuration of the blade to machine this configuration into the cable.

17. Apparatus as claimed in claim 15 wherein the forming configuration of the blade is positioned only on a portion of the cutting edge side of the blade to enable the cutting corner of the forming configuration to enter the cable along a single radius drawn from the longitudinal central axis of the cable when said cable is located in said cable guide.

* * * * *